US009315329B2

(12) United States Patent
Guo

(10) Patent No.: US 9,315,329 B2
(45) Date of Patent: Apr. 19, 2016

(54) MATERIAL TRANSFER DEVICE

(71) Applicant: HON HAI PRECISION INDUSTRY CO., LTD., New Taipei (TW)

(72) Inventor: Ming-Lung Guo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 114 days.

(21) Appl. No.: 14/159,428

(22) Filed: Jan. 20, 2014

(65) Prior Publication Data

US 2014/0202832 A1    Jul. 24, 2014

(30) Foreign Application Priority Data

Jan. 24, 2013 (TW) .............................. 102102556 A

(51) Int. Cl.
*B65G 25/04* (2006.01)
(52) U.S. Cl.
CPC ...................................... *B65G 25/04* (2013.01)
(58) Field of Classification Search
None
See application file for complete search history.

(56) References Cited

U.S. PATENT DOCUMENTS

| | | | | |
|---|---|---|---|---|
| 4,910,858 A | * | 3/1990 | Takeda ................... | H01F 41/067 198/409 |
| 6,012,471 A | * | 1/2000 | Calvin .................... | B29C 31/00 134/58 R |
| 2009/0065012 A1 | * | 3/2009 | Patel ...................... | A24D 1/025 131/284 |

* cited by examiner

*Primary Examiner* — Kavel Singh
(74) *Attorney, Agent, or Firm* — Novak Druce Connolly Bove + Quigg LLP

(57) ABSTRACT

A material transfer device is configured for transferring a number of molded products. The material transfer device includes a control box and a transfer mechanism. The transfer mechanism includes a receiving chamber, a driving device, and a supporting structure. The receiving chamber is located on the control box. The driving device is located on a side surface of the receiving chamber and extends into the receiving chamber. The supporting structure includes a holder, a rotating portion, and a number of supporting plates. The holder is located on the driving device to be driven thereby to move along the receiving chamber. The rotating portion is fixed on the holder. The supporting plates are fixed on the rotating portion. The rotating portion drives the supporting plates to rotate.

8 Claims, 4 Drawing Sheets

MATERIAL TRANSFER DEVICE

BACKGROUND

1. Technical Field

The present disclosure relates to a material transfer device.

2. Description of Related Art

Injection-molded products, such as lenses, are molded in a runner system. After the products are molded, the runner system is positioned on a retainer of a shearing machine for shearing the molded lenses. However, the runner system is manually positioned on the shearing machine, which is inconvenient.

Therefore, it is desirable to provide a material transfer device that can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
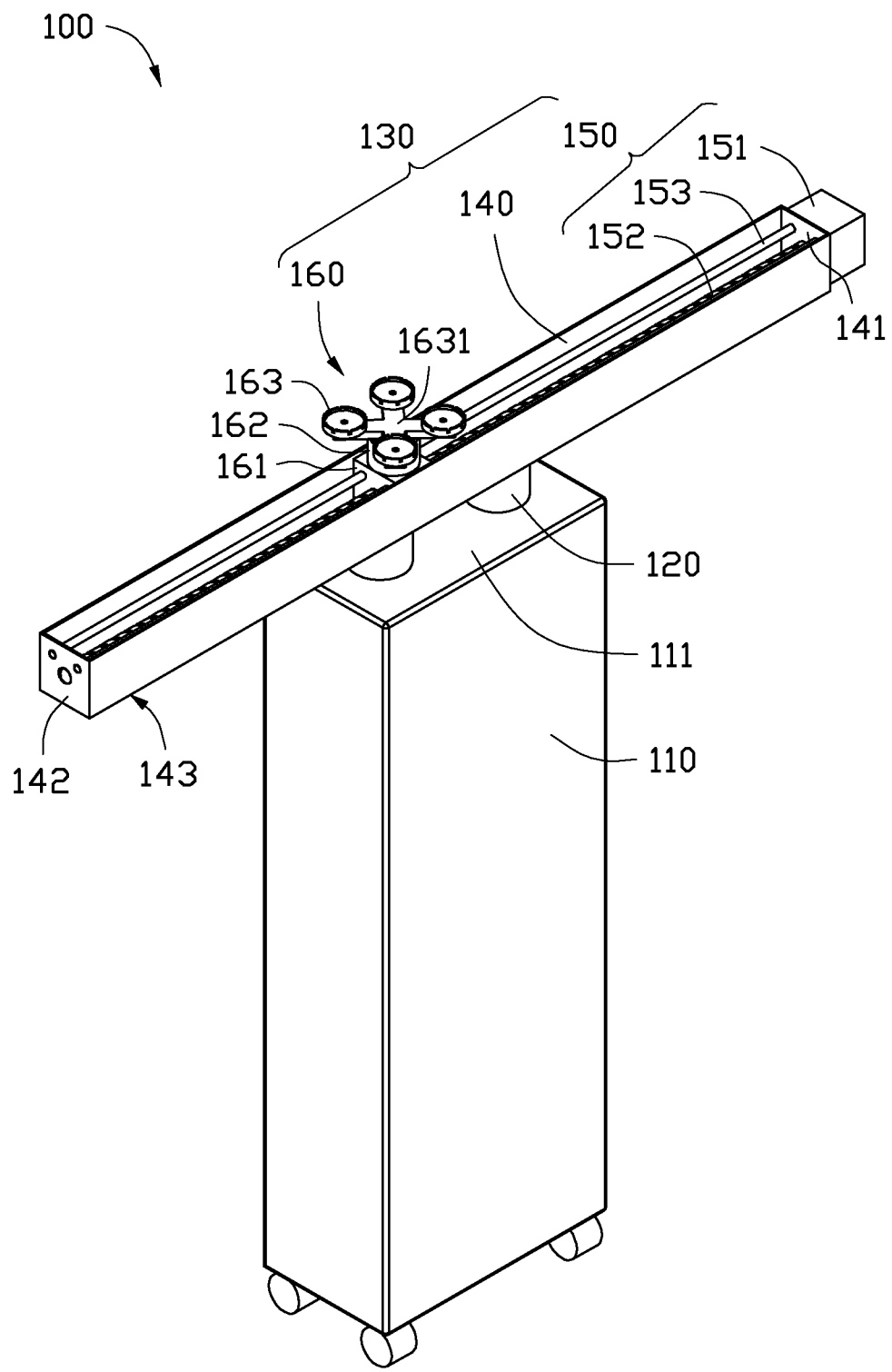
FIG. 1 is an assembled, isometric view of an embodiment of a material transfer device.
Figure 2:
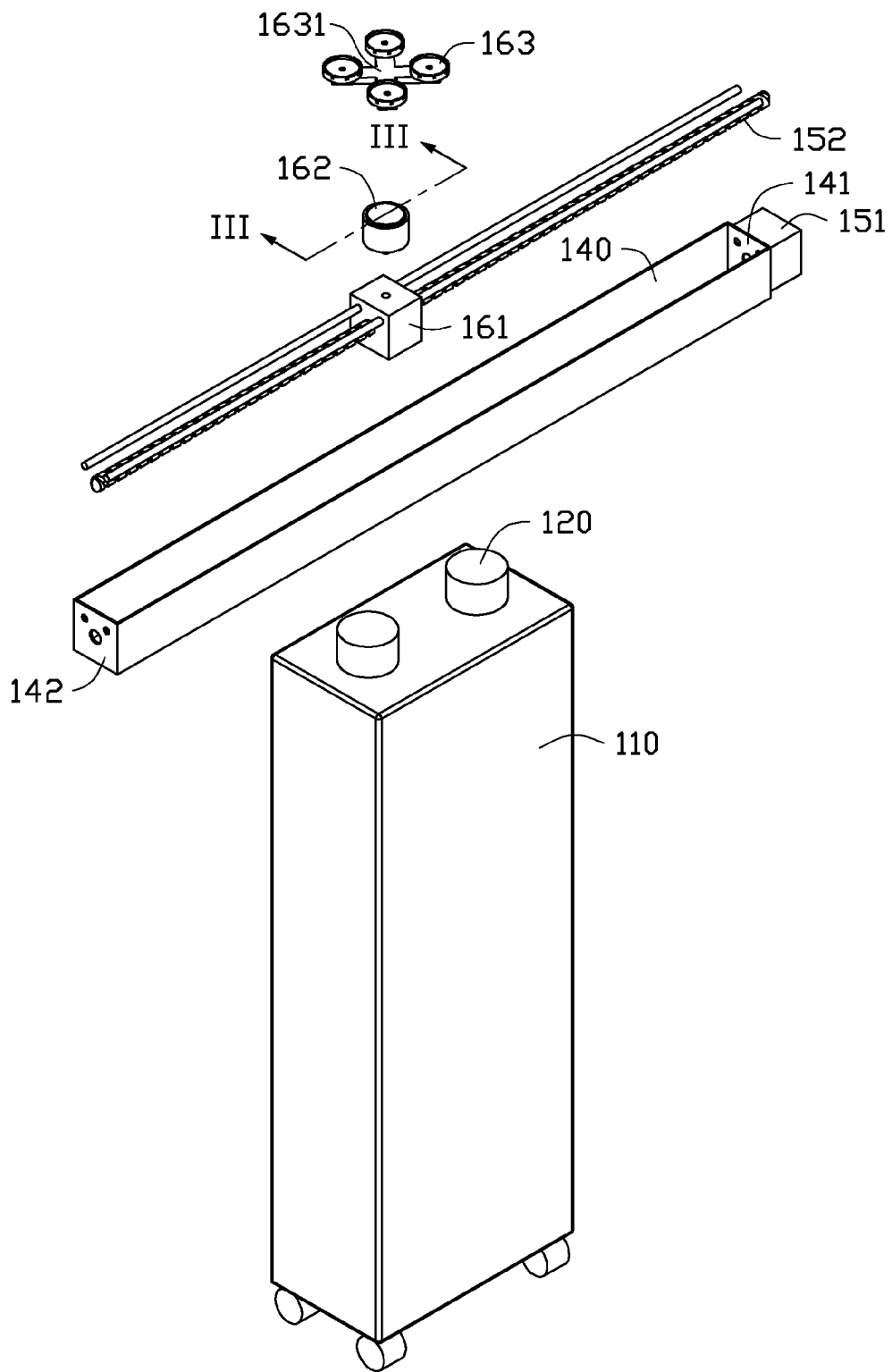
FIG. 2 is an exploded, isometric view of the material transfer device of FIG. 1.
Figure 3:
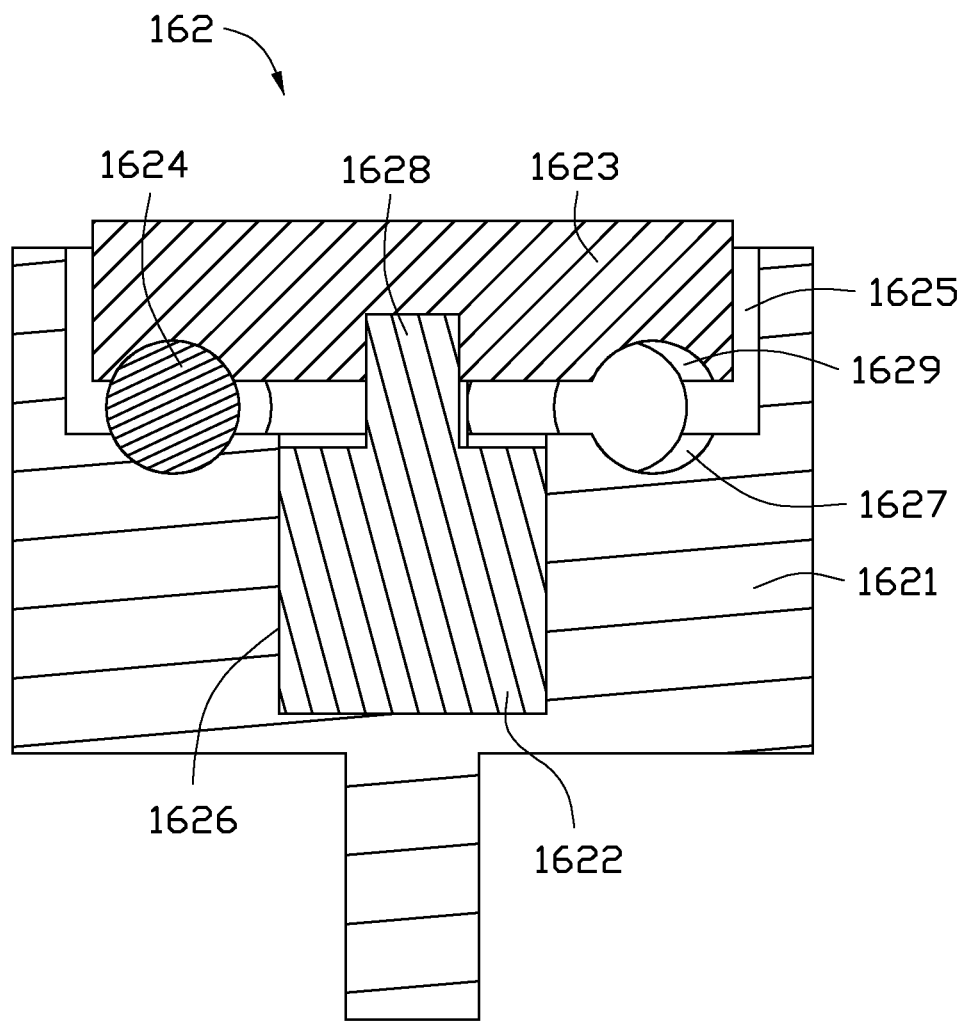
FIG. 3 is a cross-sectional view taken along line III-III of FIG. 2.
Figure 4:
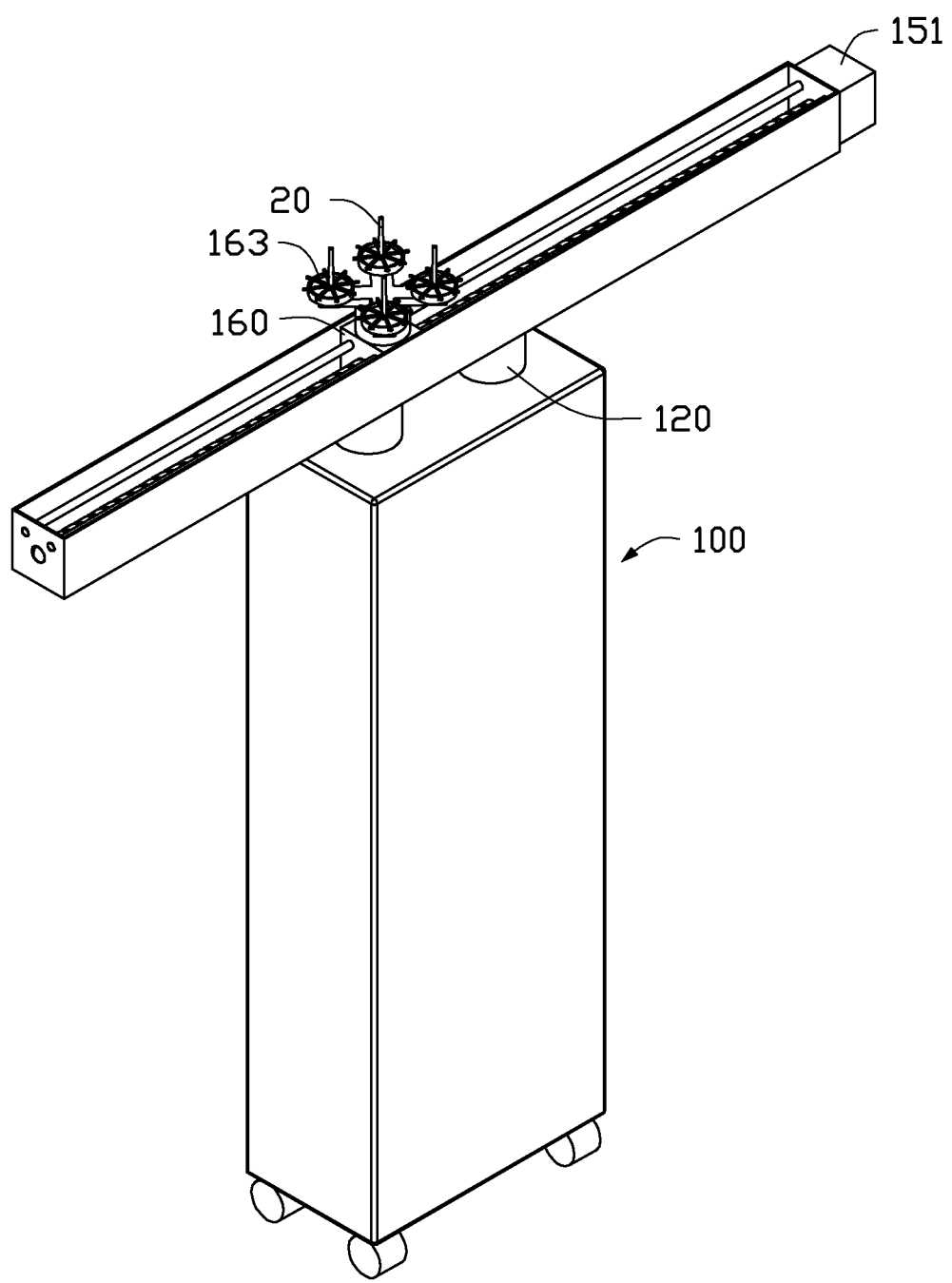
FIG. 4 is similar to FIG. 1, but shows the material transfer device in a state of use.

FIGS. 1-4 show an embodiment of a material transfer device 100. The material transfer device 100 includes a control box 110, two supporting poles 120, and a transfer mechanism 130.

In one embodiment, the control box 110 is substantially cuboid and includes a top plate 111.

The two supporting poles 120 extend substantially perpendicularly from the top plate 111 of the control box 110. The material transfer device 100 includes a lifting device (not shown) and a controlling device (not shown) received in the control box 110. The lifting device is connected to the supporting poles 120 to move the supporting poles 120 up and down relative to the top plate 111. The control device is electrically connected to the lifting device to control the lifting device to move the supporting poles 120. In the illustrated embodiment, there are two supporting poles 120. In other embodiments, a number of the supporting poles 120 can be one or more than two.

The transfer mechanism 130 includes a receiving chamber 140, a driving device 150 and a supporting structure 160.

In one embodiment, the receiving chamber 140 is substantially cuboid and includes a first side plate 141, a second side plate 142, and a bottom plate 143. The first side plate 141 is substantially parallel to the second side plate 142. The bottom plate 143 is connected substantially perpendicularly between the first side plate 141 and the second side plate 142. The bottom plate 143 is fixed on an end of the supporting poles 120 away from the control box 110.

The driving device 150 includes a first motor 151, a screw pole 152, and two guiding poles 153. The first motor 151 is located on an external surface of the first side plate 141. A first end portion of the screw pole 152 passes through the first side plate 141 and connects to the first motor 151. A second end portion of the screw pole 152 is rotatably connected to the second side plate 142. The first motor 151 drives the screw pole 152 to rotate. An external surface of the screw pole 152 forms a number of external threads (not labeled). Each guiding pole 153 is located at a corresponding side of the screw pole 152. Each guiding pole 153 is connected between an internal side surface of the first side plate 141 and an internal side surface of the second side plate 142.

The supporting structure 160 includes a holder 161, a rotating portion 162, and a plurality of supporting plates 163. The holder 161 is connected to the driving device 150. The rotating portion 162 and the supporting plates 163 are moved by the holder 161, and the holder 161 is moved along the guiding poles 153 by the driving device 150.

In one embodiment, the holder 161 is substantially cuboid and defines an internal threaded hole (not labeled) and two guiding holes (not labeled). The screw pole 152 is received through the internal threaded hole, and the guiding poles 153 are received through respective guiding holes. The internal threaded hole forms a number of internal threads (not labeled) corresponding to the external threads of the screw pole 152. Thus, the holder 161 is movable along a length of the screw pole 152 via engagement between the external threads of the screw pole 152 and the internal threads of the internal threaded hole.

The rotating portion 162 is located on a side of the holder 161 away from the supporting poles 120. The rotating portion 162 includes a fixing portion 1621, a second motor 1622, a rotating member 1623, and a plurality of ball bearings 1624. The fixing portion 1621 is fixed on the holder 161. The fixing portion 1621 defines a first receiving space 1625 in a side away from the holder 161. A bottom surface of the first receiving space 1625 defines a second receiving space 1626. In one embodiment, the first receiving space 1625 and the second receiving space 1626 are substantially circular, and a diameter of the first receiving space 1625 is larger than that of the second receiving space 1626. The bottom surface of the first receiving space 1625 further defines a first recessed portion 1627 around the second receiving space 1626.

The second motor 1622 is received in the second receiving space 1626. The second motor 1622 drives the rotating member 1623 to rotate. A rotating axle 1628 extends from a top side of the second motor 1622.

The rotating member 1623 is received in the first receiving space 1625 and fixed to the rotating axle 1628, so that the rotating member 1623 can be driven by the rotating axle 1628 to rotate when the second motor 1622 drives the rotating axle 1628 to rotate. The rotating member 1623 defines a second recessed portion 1629 corresponding with the first recessed portions 1627. The first recessed portion 1627 and the corresponding second recessed portion 1629 cooperatively receive the ball bearings 1624 therebetween. The ball bearings 1624 reduce resistance when the second motor 1622 drives the rotating member 1623 to rotate.

The supporting plates 163 are located on the rotating member 1623. In the illustrated embodiment, there are four supporting plates 163. The supporting plates 163 are connected to the rotating member 1623 by a cruciform fixing structure 1631. Each supporting plate 163 is located on a corresponding branch of the cruciform fixing structure 1631, so that the supporting plates 163 can be driven by the rotating member 1623 to predetermined positions when the second motor 1622 drives the rotating member 1623 to rotate. In other embodiments, a number of the supporting plates 163 can be more or less than four, and the cruciform fixing structure 1631 can be replaced by a fixing structure including a corresponding number of branches.

In one embodiment, the first motor 151 and the second motor 1622 are controlled by the control device in the control box 110.

In use, the support poles 120 are extended or retracted relative to the top plate 111 to adjust the material transfer device 100 to an appropriate position. The first motor 151 rotates the screw pole 152 to move the supporting structure 160 toward a molding machine (not shown), and the second motor 1622 rotates the supporting plates 163, so that an arm of the molding machine can put a molded product 20 on a corresponding supporting plate 163. The first motor 151 continues to rotate the screw pole 152 to move the supporting structure 160 along the guiding poles 153 toward a shearing machine for shearing the molded products 20. The second motor 1622 rotates the supporting plate 163 to the appropriate position, so that the arm of the molding machine can remove the sheared molded products 20 from the corresponding supporting plates 163.

In other embodiments, a number of the supporting structures 160 can be more than one to transfer more molded products 20.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A material transfer device configured for transferring a plurality of molding products, the material transfer device comprising:
   a control box; and
   a transfer mechanism comprising a receiving chamber, a driving device, and a supporting structure, the receiving chamber being positioned on the control box, the driving device being positioned on a side surface of the receiving chamber and extending into the receiving chamber, the supporting structure comprising a holder, a rotating portion and a plurality of supporting plates, the holder being positioned on the driving device to be driven by the driving device to move along the receiving chamber, the rotating portion being fixed on the holder, the supporting plates being fixed on the rotating portion, the driving device driving the supporting structure to move relative to the receiving chamber, the rotating portion driving the supporting plates to rotate;
   wherein the driving device comprises a first motor, a screw pole and at least one guiding pole; the receiving chamber comprises a first side plate, a second side plate, and a bottom plate, the bottom plate being connected between the first side plate and the second side plate, the first motor being located on an external surface of the first side plate, a first end portion of the screw pole passing through the first side plate and connecting to the first motor, a second end portion of the screw pole being rotatable connected to the second side plate, the at least one guiding pole being connected between an internal side surface of the first side plate and an internal side surface of the second side plate.

2. The material transfer device of claim 1, further comprising two supporting poles, wherein the control box comprises a top plate, the two supporting poles extending substantially perpendicular from the top plate of the control box, the receiving chamber being fixed on the supporting poles, the two supporting poles being capable of moving up and down relative to the top plate to adjust the transfer mechanism.

3. The material transfer device of claim 2, wherein the holder being positioned on the screw pole and the at least one guiding pole, the supporting structure being moved along the at least one guiding pole by the first motor, the first motor being positioned on a side surface of the receiving chamber and the at least one guiding pole and the screw pole extending into the receiving chamber.

4. The material transfer device of claim 3, wherein the first side plate being substantially parallel to the second plate, the bottom plate being substantially perpendicularly connected to the first side plate and the second side plate, the bottom plate being fixed on the supporting poles.

5. The material transfer device of claim 1, wherein the rotating portion includes a fixing portion, a second motor and a rotating member, the fixing portion being fixed on the holder, the fixing portion defining a first receiving space in a side away from the holder, a bottom surface of the first receiving space defining a second receiving space, the rotating member being received in the first receiving space, the second motor being received in the second receiving space, the second motor driving the rotating member to rotate.

6. The material transfer device of claim 5, wherein the rotating portion further comprises a plurality of ball bearings, the bottom surface of the first receiving space further defining a first recessed portion around the second receiving space, the rotating member defining a second recessed portion corresponding with the first recessed portion, the first recessed portion and the corresponding second recessed portion cooperatively receiving the ball bearings therebetween.

7. The material transfer device of claim 5, wherein the supporting structure further comprises a fixing structure including a plurality of branches, the fixing structure being fixed on the rotating member, each supporting plate being located on a corresponding branch of the fixing structure.

8. The material transfer device of claim 1, further including a control device received in the control box, the control device being configured to control the movement of the supporting structure and control the rotating portion to rotate the supporting plates.

* * * * *